UNITED STATES PATENT OFFICE.

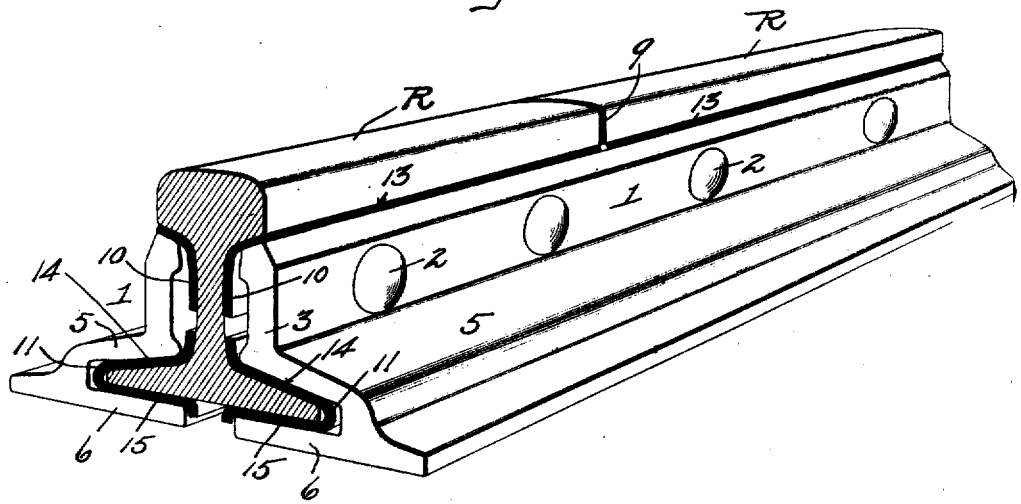
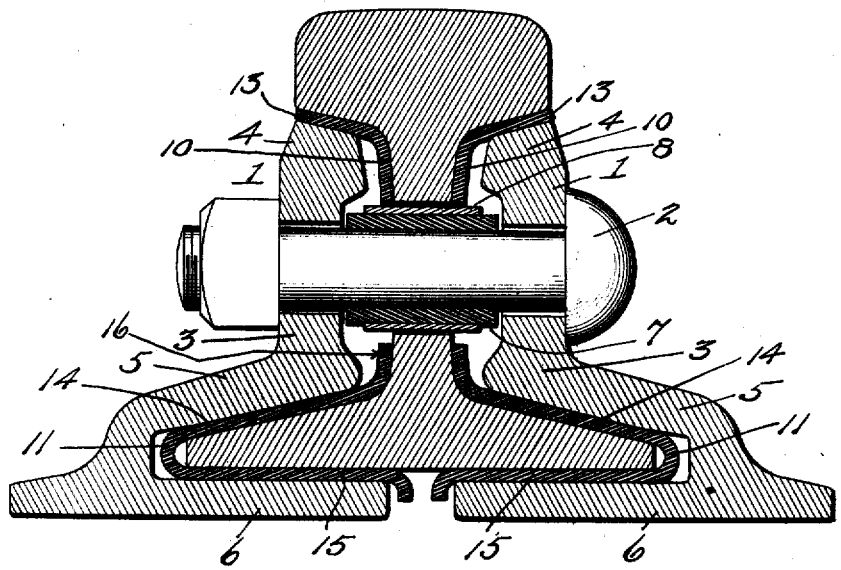

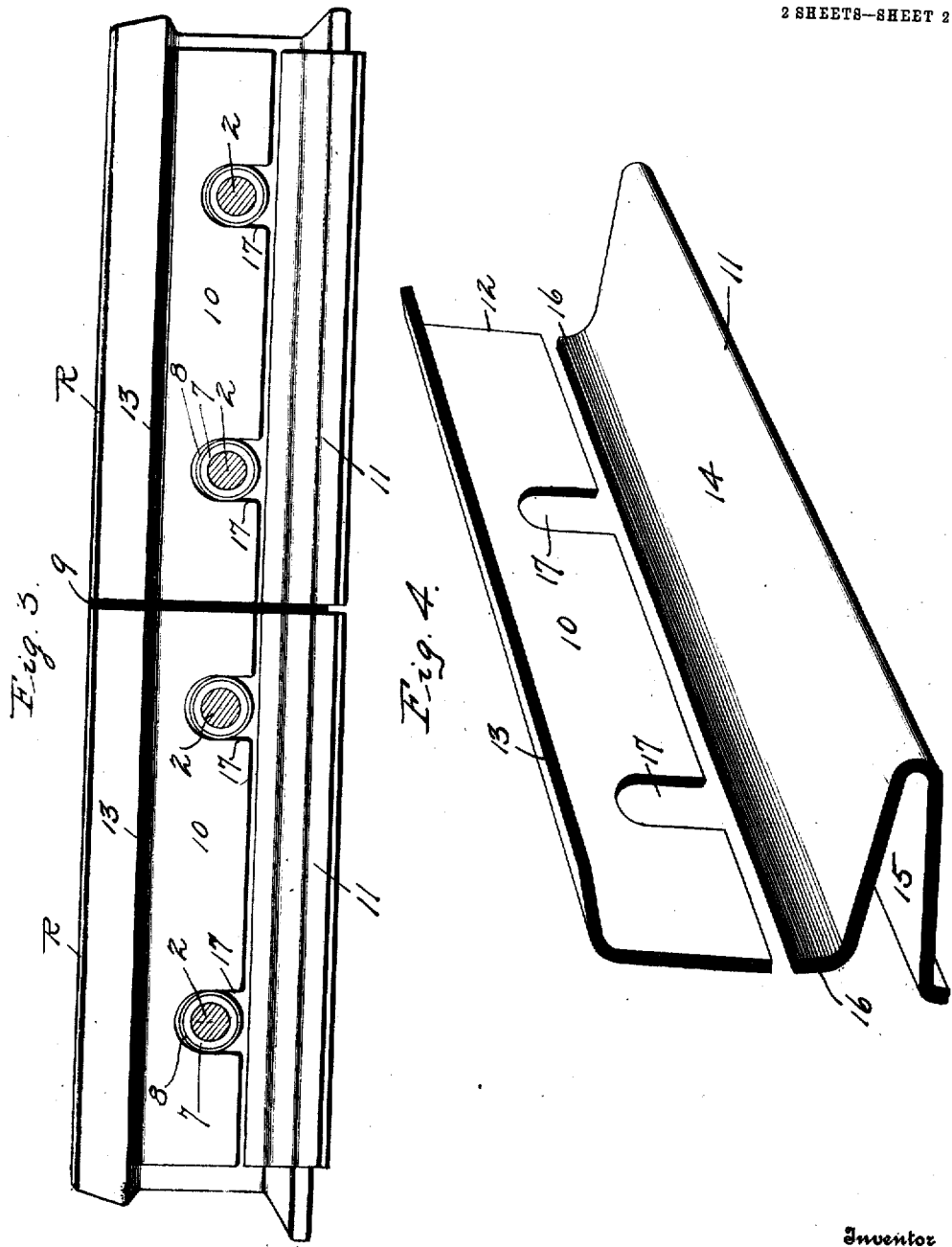

EDWARDS F. SCHERMERHORN, OF BROOKLYN, NEW YORK, ASSIGNOR TO THE RAIL JOINT COMPANY, OF NEW YORK, N. Y., A CORPORATION OF NEW YORK.

INSULATED RAIL-JOINT.

No. 909,458.     Specification of Letters Patent.     Patented Jan. 12, 1909.

Application filed April 23, 1908. Serial No. 428,766.

*To all whom it may concern:*

Be it known that I, EDWARDS F. SCHERMERHORN, a citizen of the United States, residing at Brooklyn, in the county of Kings and State of New York, have invented certain new and useful Improvements in Insulated Rail-Joints, of which the following is a specification.

This invention relates to the subject of insulated rail joints, and more particularly to a practical improvement in the insulation for joints of that character.

A special object of the invention is to provide an improvement in the structural formation of the insulation employed in insulating rail joints whereby the insulating material may be utilized to the very best advantage along thoroughly practical lines, so as to secure a maximum economy in service while at the same time insuring great facility in the renewal of worn out sections or pieces of the insulation. In carrying out this object the invention is intended to provide a construction wherein that part of the insulation which is subject to the most rapid wear is readily removable and replaceable without disturbing or affecting in the least the remaining portions of good, or unworn insulation, thus involving the most economical conditions for maintenance and repair.

With these and other objects in view, the invention consists in the novel construction and arrangement of the insulation as will hereinafter be more fully described, illustrated and claimed.

The essential feature of the invention involved in the particular construction and arrangement of the insulation material is susceptible to structural modifications and to application to various kinds of joints, without departing from the scope thereof, but certain embodiments of the invention are exemplified by the accompanying drawings, in which:

Figure 1 is a sectional perspective view of an insulated rail joint, of the continuous type, showing the joint equipped with sectional side insulation such as contemplated by the present invention. Fig. 2 is a cross sectional view of the joint shown in Fig. 1, the line of section including one of the bolts. Fig. 3 is a side elevation of the joint with the metallic side joint bar removed to expose the sectional side insulation, and suggesting one way in which the separate sections of insulation may be utilized in carrying out the invention. Fig. 4 is a detail perspective view of the improved sectional side insulation, showing the proper relative positions of the separate upper and lower sections.

Like references designate corresponding parts in the several figures of the drawings.

As indicated, the distinctive feature of the present invention resides in the sectional insulation employed at the sides of the joint and so constructed and arranged as to permit those sections which are subjected to the greatest wear to be readily renewed, and which sections are therefore necessarily removable and replaceable. The invention provides that this removing and replacing of worn sections of insulation may be readily accomplished without dismembering the joint and also without disturbing the other good and unworn sections of insulation. This desirable construction, for insulating purposes, may be embodied in any or all varieties of rail joints, employing fish plates, angle bars, channel bars, or any of the divers forms of splices which extend across the joint between the meeting ends of the rails and are fastened to the latter by the usual joint bolts, but inasmuch as the improved insulation provides a most satisfactory and practical insulated joint of the well known continuous type, the latter is shown in the figures of the drawings for the purpose of exemplifying the improvements, and referring to the embodiment of the invention suggested in the drawings, of the rail joint shown essentially comprises, in its general organization, the service rails R, the opposite joint bars 1, 1, of the continuous type, and the usual joint bolts 2. The said side joint bars are of the conventional continuous design, each of the same consisting of an angle bar member 3 having at its upper edge the top bearing head 4 underlying the head of the rail, and at its lower edge formed with the usual offstanding inclined foot flange 5 overlying the rail flange, and the horizontal inwardly extending rail supporting base section 6 integrated with the foot flange of the angle bar and disposed beneath the rail bottom, all of which is well understood by those familiar with the art.

In carrying out the present invention, any suitable well known bolt insulation may be utilized, but for illustrative purposes there is suggested in the drawings the expedient of having the heads and nuts of the bolts bear directly upon the outer faces of the joint bars, and in sheathing the intermediate portions thereof in insulating sleeves or bushings 7. These insulating sleeves or bushings 7 are made of fiber or other suitable insulating material and are arranged to surround the bolts in the bolt holes in the webs of the rails, and in order to reinforce the said insulating sleeves or bushings, the same may have fitted snugly thereover the metal reinforcing collars or sleeves 8, as plainly shown in the sectional view of Fig. 2 of the drawings. In addition to the bolt insulation, the insulated rail joint also includes in its construction the usual insulating end post or equivalent insulation 9 interposed between the meeting ends of the rails, but the distinguishing improvement of the present invention resides in having the insulation for the sides of the joint of a sectional formation to perform the functions and secure the advantages hereinbefore pointed out. The said sectional side insulation is made of the usual fiber sheets or of other insulating material, and in its application to a rail joint of the character shown in the drawings, the same is interposed between the rails and the side joint bars and follows the general contour of such bars so as to extend discontinuously from points beneath the rail heads, about the rail sides, and over and under the rail flanges, as plainly shown for instance in Fig. 2 of the drawings, thus affording complete and effective insulation for all bearing points and faces of the joint bars. But in carrying out the invention, the side insulation at each side of the joint, may be said to be divided in two longitudinally and horizontally so as to dispose separate sections of insulation respectively above and below the horizontal line of bolts. Hence, in this preferable embodiment, the sectional side insulation, at each side of the rail joint, essentially consists of separate upper and lower insulation sections 10 and 11 respectively, forming complemental parts of the side insulation, but entirely separate and distinct from the standpoint of being separately removable and replaceable, thus admitting of those parts which are subject to the greatest wear being removed and replaced with the greatest facility, and without dismembering or taking apart the joint.

Usually the separate upper and lower insulation sections 10 and 11 are co-extensive in length, and may either extend continuously the full length of the joint or may be cut in separate pieces for each rail, and not cross the joint between the meeting ends of the rails as suggested in Fig. 3 of the drawings. However, irrespective of the length of the sections 10 and 11 of the insulating material, it will be observed by reference to the drawings that the said upper section 10 is ordinarily in the form of a strip of fiber or other insulating material having its vertically disposed body portion 12 arranged against the side or web of the rail and formed at its upper edge with an outwardly deflected top flange 13 which is interposed between the bearing head 4 of the joint bar and the under side of the rail head. The companion lower section 11 of the sectional insulation is preferably in the form of an insulating cuff, likewise made of fiber or other suitable insulating material, and conforming in cross section to the cross sectional form of the rail flange, said cuff being therefore provided with an upper inclined member 14 interposed between the foot flange 5 of the joint bar and the upper side of the rail flange, and with a bottom inwardly extending horizontal base section 15 integrated with the member 14 and interposed between the base section 6 of the joint bar and the bottom of the rail. Furthermore, the said lower insulation section or cuff 11 is preferably formed at the inner edge of its upper member 14 with an upstanding flange extension 16 constituting a part of the side insulation and arranged against the web of the rail, particularly at the juncture of the latter with the rail flange.

From the construction described, it will be noted that the upper and lower sections 10 and 11 of insulation are respectively disposed above and below the horizontal line of bolts, and a structural feature of practical importance in connection with the upper section 10 of insulation is to provide said section, in its body portion, with a plurality of vertically disposed open keeper slots or notches 17 adapted to take over the joint bolts when said section is fitted in position between the joint bar and the rails. In this connection, the keeper slots or notches 17 correspond in position and number to the joint bolts, and it will be obvious that the function of said slots or notches is to effectually secure the upper insulation sections 10 against displacement endwise or downwardly.

Referring to the practical working of the invention, it will be well understood by those familiar with the art that the upper sections 10 of insulation are the parts which are subjected to the greatest wear and hence deteriorate and wear out more rapidly and more quickly than the other parts of the insulation. Hence, said sections 10 of insulation are the pieces which must necessarily be renewed from time to time to preserve the integrated structure as an insulated rail joint, and this can be readily accomplished by simply loosening the bolts slightly, drawing out the worn or damaged section, and slipping in the duplicate renewal piece, after which the bolts only need to be tightened up to restore the joint to normal working condition. In this operation it is unnecessary to disturb in any way the lower sections of insulation, but if at any time these latter sections need replacing, that can be readily done without throwing away or damaging any other part of the insulation. Also, in connection with the suggested arrangement shown in Fig. 3 of the drawings, those sections of insulation at one side of the meeting ends of the rails may be removed and replaced without affecting or disturbing those at the other side of the joint between the meeting ends of the rails, so it will be seen that the present invention is capable of utilization in various ways best calculated to preserve the most economical conditions from the standpoint of maintenance and repair.

A preferable and practical embodiment of the invention has been described herein, but it will be understood that various changes in the form, proportion, and minor details of construction as fall within the scope of the appended claims, may be resorted to without departing from the spirit or sacrificing any of the advantages of the invention.

I claim:

1. In an insulated rail joint, the rails, side joint bars, and sectional side insulation consisting of separate upper and lower sections disposed respectively above and below the line of bolts, said upper section of insulation being separably interlocked with the joint bolts.

2. In an insulated rail joint, the rails, side joint bars, and side insulation comprising upper and lower sections respectively interposed between the heads and flanges of the rails and said joint bars, said upper section of insulation being separably interlocked with the joint bolts.

3. In an insulated rail joint, the rails, side joint bars, and side insulation including a detachable section of insulation arranged beneath the rail head and having open keeper slots taking over the joint bolts.

4. In an insulated rail joint, the rails, side joint bars, and sectional side insulation consisting of upper and lower sections disposed respectively above and below the line of bolts, and said upper section being separately removable from beneath the rail head and provided in its lower edge with open keeper slots taking over the joint bolts.

5. In an insulated rail joint, the rails, side joint bars, and sectional side insulation consisting of upper and lower sections disposed respectively above and below the line of bolts, said upper section being arranged beneath the rail head and loosely interlocked with the joint bolts, and said lower section being in the form of a cuff embracing the rail flange.

In testimony whereof I hereunto affix my signature in the presence of two witnesses.

EDWARDS F. SCHERMERHORN.

Witnesses:
WALTER S. OGILVY,
BENJ. WOLHAUPTER.